United States Patent Office 3,392,111
Patented July 9, 1968

3,392,111
REGENERATION OF ION EXCHANGE CATALYST
IN SWEETENING PROCESS
Harris G. Napier and Alfred R. Pate, Jr., Tyler, Tex., and
Robert H. Elkins, Hinsdale, and John M. Ferrara, Chicago, Ill., assignors to Howe-Baker Engineers, Inc.,
Tyler, Tex., a corporation of Texas
No Drawing. Continuation-in-part of application Ser. No.
509,630, Nov. 24, 1965. This application June 16, 1967,
Ser. No. 646,459
9 Claims. (Cl. 208—191)

ABSTRACT OF THE DISCLOSURE

An improved process for sweetening hydrocarbons is directed to the regeneration of particulate ion exchange catalyst containing an ionically-bound metal, such as copper, mercury, silver, lead, platinum, etc. The regenerant is ammonia or an amine which is passed through the catalyst bed during the regeneration cycle.

---

This application is a continuation-in-part of application Ser. No. 509,630 which was filed on Nov. 24, 1965 and now abandoned. The invention disclosed in the application represents an improved embodiment of the invention disclosed in copending application Ser. No. 581,-434 which was filed on Sept. 23, 1966, in the names of John M. Ferrara and John E. Ryder and entitled "Sweetening Hydrocarbon Liquids." In said copending application sour hydrocarbon compositions are sweetened by contact with a particulate material selected from the group consisting of (1) an aluminosilicate ion exchange composition containing an ion of a metal at its functional site, and (2) a synthetic organic resin ion exchange composition containing an ion of a metal at its functional site. Many hydrocarbon compositions derived from the refining, cracking, reforming, and/or distillation of petroleum oils contain aprpeciable quantities of mercaptans. These mercaptans are objectionable primarily because of their odor. They are also catalyst-poisoning compounds for several types of catalysts used in the refining, reforming and/or cracking of hydrocarbon compositions.

The effective removal of mercaptans from hydrocarbons has been a vexing problem to the petroleum industry for many years, and many techniques have been proposed for such removal. These techniques have not been entirely successful both with respect to the costs involved and with respect to the results that were achieved.

In the process disclosed in copending application Ser. No. 581,434 an improved process for sweetening sour hydrocarbon compositions is disclosed wherein liquid hydrocarbons are brought into intimate contact with a finely divided particulate solid ion exchange composition which contains a metallic element. More specifically, the process hydrocarbons are sweetened by placing the sour hydrocarbon composition in intimate contact with particulate ion exchange materials containing certain metals ionically bound to said materials. The ion exchange materials that can be used in the process include inorganic aluminosilicates such as natural and synthetic zeolites as well as synthetic organic cation and anion exchange materials. Preferred ion exchange materials include amorphous synthetic zeolites of the formula $Na_2O \cdot Al_2O_3 \cdot 6SiO_2 \cdot XH_2O$ and macroporous sulfonic acid ion exchange resins. The metallic element is one found in Groups I-B, II-B, IV, V, VI, and VIII of the Periodic Table. The preferred metal ions include cupric, mercuric, silver, lead, cobaltic, ferric, platinum and palladium. The most preferred ions are the cupric and mercuric ions and especially the cupric ion. In a particular embodiment of the process, the sour hydrocarbon compositions are placed in intimate contact with a complex of the metal ion exchange composition.

The process described in the aforementioned applications is highly successful in eliminating mercaptans from hydrocarbon stocks. The present invention has as its objective a further improvement in the techniques disclosed in these applications. A particular object of the present invention is to provide a more effective method for regenerating the spent ion exchange catalyst used to eliminate the mercaptans. The subject technique is far more efficient with respect to bringing the catalyst back to its original capacity than previously known systems.

Other objects will become apparent to those skilled in the art from the following detailed description of the invention.

In general, the subject invention is directed to a method of regenerating spent catalyst which has been used to sweeten sour hydrocarbons. The catalyst is a particulate ion exchange composition containing copper, mercury, silver, gold, platinum, or palladium. In the regeneration ammonia or an amine is used as the regenerant. In a preferred embodiment ammonia or an amine is dissolved in water or an organic solvent such as N-butanol, isopropanol, benzene, kerosene, naphtha, acetone, dimethyl sulfoxide, dimethyl formamide, carbon tetrachloride, methanol, ethanol, α-butyrolactone, and mixtures of any of the above such as benzene-isopropanol and benzene-methanol. In addition to ammonia, amines including primary, secondary and tertiary amines, diamines, polyamines, heterocyclic amines, and aromatic amines can be used in the process. Specific amines include methyl amine, ethyl amine, propyl amine, butyl amine, ethylene diamine, N-methylethylene diamine, N-ethylethylene diamine, propylene diamine, diethylene triamine, tetraethylene pentamine, pentaethylene hexamine, and aniline. Pyridine is considered a heterocyclic amine and can be used in carrying out the subject invention. In certain instances the amines are used alone, but in most cases the amines are dissolved in water or an organic solvent of the type described above. Aqueous solutions of amines or ammonia are preferably employed in the process. In a most preferred embodiment an oxidizing agent such as air or molecular oxygen is dissolved in the ammonia or amine solution before it is placed in contact with the spent catalyst.

Ordinarily, the spent catalyst is regenerated by passing an aqueous solution of ammonia or ammonia dissolved in an organic solvent upflow through the catalyst. The ammonia solution appears to perform the dual function of removing organic foulants and reactivating the catalyst's active sights. A single ammonia solution wash usually lasts for approximately 8 hours. The number of 8-hour washes is dictated by the discoloration of the ammonia solution. Generally, from 2 to 4 washes are satisfactory. After completion of the ammonia washes the catalyst is washed with fresh organic solvent. This completes the regeneration cycle and the catalyst is returned to the sweetening operation.

The ammonia solution regeneration procedure has produced a higher catalyst activity than any other previous regeneration technique. This is also true where other amines are used in place of ammonia.

The following examples illustrate the subject invention.

Example 1

This example illustrates the regeneration of a spent catalyst. The catalyst was a finely divided macroporous sulfonic acid ion exchange resin in the $Cu^{++}$ form. In this example ammonia dissolved in isopropanol was used as the regenerant.

Initially, 200 ml. of isopropanol was weighed. Ammonia was then bubbled into the alcohol through a gas dispersion tube. Bubbling was continued until from 4 to 6 grams of $NH_3$ had been absorbed by the isopropanol. The catalyst was continuously washed using a small bellows pump upflow with the same solution in a closed system. Upflow regeneration is preferred since during sweetening, foulant concentration is highest near the top of the catalyst bed, and thus the bed is cleaned without forcing the bulk of the foulant through the entire bed. The solution can be circulated at any desired rate of flow. A liquid hourly space velocity (LHSV) of 12, which in this case is 600 ml. per hour, was selected for the following tests. With an increase in LHSV the wash periods, of course, could be shortened.

FEED: LIGHT VIRGIN NAPHTHA (LVN)

| | Regeneration | Sweetening No.* |
|---|---|---|
| Run: | | |
| 1 | 3.6% $NH_3$ in 2-propanol. Running nil RSH. | 429,000 |

FEED: LIGHT CATALYTICALLY CRACKED NAPHTHA (LCN)

| | Regeneration | Sweetening No.* |
|---|---|---|
| Run: | | |
| 1 | 2.8% $NH_3$ in 2-propanol | 54,000 |
| 2 | do | 26,200 |
| 3 | do | 41,500 |
| 4 | 2.8% $NH_3$ in 2-propanol. Running sweet. | 79,000 |

*The concept of sweetening number was derived to overcome the problem of correlating widely varying mercaptan content feeds.

Sweetening number permits the analysis of data from a wide variety of mercaptan content feeds on a roughly equivalent basis. Sweetening number is the product of the mercaptan content in parts per million multiplied by the bed volumes of naphtha treated:

Sweetening Number = (p.p.m.) (bed volumes)

The use of this concept has resulted in the successful correlation of data from a variety of feedstocks.

The above results show that the regenerated catalyst had excellent sweetening capacity. The regeneration procedure provided extremely high catalyst activity.

Example 2

This example illustrates the use of pyridine as a catalyst regenerator. The catalyst used in these tests again was a finely divided macroporous sulfonic acid ion exchange resin in the $Cu^{++}$ form. This catalyst is described in detail in copending application Ser. No. 358,086 which was filed on Apr. 7, 1964.

FEED: LIGHT VIRGIN NAPHTHA (LVN)

| | Regeneration | Sweetening No.* |
|---|---|---|
| Run: | | |
| 1 | 100% Pyridine | 145,000 |
| 2 | do | 114,000 |
| 3 | 100% Pyridine. Running nil RSH. | 154,000 |

As is apparent from the above results, the regeneration of a spent catalyst with pyridine also produces excellent results.

Example 3

In this example numerous tests are set forth illustrating the invention both with respect to various catalysts and with respect to various regeneration agents. The sweetening runs set forth below were all carried out at a temperature of 80° F. at 18 LHSV, and with 50 ml. of resin. In the runs set forth below both the sweetening number and the regenerant are indicated. The first run illustrates the use of the known steam method of regenerating spent catalyst as well as the subsequent use of pyridine to reactivate the same catalyst. In the second run pyridine and aqueous ammonia are used as the regenerant. The catalyst is the same type of catalyst as was used in run No. 1. In the third run various pyridine washes were used to regenerate a spent catalyst. In the forth run a spent resin, which was pretreated with ammonium hydroxide, was regenerated with an aqueous ammonia solution.

| | RUN 1 | RUN 2 | RUN 3 | RUN 4 |
|---|---|---|---|---|
| | CuOAc₂ Resin, Amberlite 200, +35 −40 Mesh, 2.0 Loading. | CuOAc₂ Resin, Amberlite 200, +35 −40 Mesh, 2.0 Loading. | CuOAc₂ Resin, Amberlite 200, +35 −40 Mesh, 2.0 Loading Pretreated with 2 bed volumes of Pyridine | CuOAc₃ Resin, Amberlite 200, +35 −40 Mesh, 2.0 Loading Pretreated with .50 ml. Ammonium Hydroxide (28% $NH_3$) |
| Cycle 1 | 40,000 | 41,600 | 38,053 | 37,800. |
| Regeneration | Steam | Pyridine | Pyridine (100 ml.) | 28% Ammonia in $H_2O$. |
| Cycle 2 | 19,900 | 50,500 | 27,000 | 29,700. |
| Regeneration | Steam | 28% Ammonia in $H_2O$ | Pyridine (100 ml.) | 28% Ammonia in $H_2O$. |
| Cycle 3 | 3,852 | 34,575 | 12,000 | 18,900. |
| Regeneration | Steam | 28% Ammonia in $H_2O$ | Pyridine (2-250 ml. washes) | 28% Ammonia in $H_2O$. |
| Cycle 4 | 1,284 | 27,000 | 18,900 | 10,800. |
| Regeneration | Steam | 28% Ammonia in $H_2O$ | Pyridine (2-250 ml. washes) | 28% Ammonia in $H_2O$. |
| Cycle 5 | 702 | 18,900 | 21,600 | 24,300. |
| Regeneration | Pyridine | 28% Ammonia in $H_2O$ | Pyridine (2-250 ml. washes) | 28% Ammonia in $H_2O$. |
| Cycle 6 | 31,000 | 10,809 | 29,600 | 2,700. |
| Regeneration | Pyridine | | Pyridine (2-250 ml. washes) | 28% Ammonia in $H_2O$. |
| Cycle 7 | 24,300 | | 21,870 | 10,800. |
| Regeneration | Pyridine | | | |
| Cycle 8 | 21,600 | | | |
| Regeneration | Pyridine | | | |
| Cycle 9 | 18,900 | | | |
| Regeneration | Pyridine | | | |
| Cycle 10 | 24,300 | | | |

In this series of tests a spent $CuSO_4$ resin was regenerated using various regeneration agents. In run No. 5 the resin was regenerated with steam in accordance with the known method of regeneration. In the sixth run a combination of pyridine and $CuSO_4$ in $H_2O$ was used as the regenerant. In the seventh run a combination of pyridine, $CuSO_4$ in $H_2O$ followed by $NH_3$ in 2-propanol was used as the regenerant. In run No. 8 a $CuSO_4$ resin was treated with $CuSO_4$ plus an aqueous ammonia solution. In run No. 9 a $CuSO_4$ resin was treated with ammonia dissolved in 2-propanol. In runs 10 and 11 the resin was treated with ammonia dissolved in 1-butanol.

silicate with a variety of aluminum salts such as sodium aluminate. Amorphous synthetic zeolites that are produced in this manner are among the preferred ion exchange compositions for use in the present invention. These zeolites have a high base exchange capacity and an essentially macroporous structure.

Example 4

This example illustrates the regeneration of a spent zeolite catalyst. The catalyst was a finely divided synthetic alumino-silicate ion exchange composition in the $Cu^{++}$ form.

|   | RUN 5 | RUN 6 | RUN 7 | RUN 8 | RUN 9 |
|---|---|---|---|---|---|
|   | $CuSO_4$ Resin, Amberlite 200, No Bead Size, Separation 1.80 Loading. Evaluated in a 3/8" column, 10 LHSV, 12 ml. Resin. | $CuSO_4$ Resin, Amberlite 200, No Bead Size, Separation 1.80 Loading. | $CuSO_4$ Resin, Amberlite 200, No Bead Size, Separation 1.80 Loading. | $CuSO_4$ Resin, Amberlite 200, No Bead Size, Separation 1.80 Loading. | $CuSO_4$ Resin, Amberlite 200, No Bead Size, Separation 1.80 Loading. |
| Cycle 1 | 12,150 | 10,800 | 10,800 | 10,800 | 13,500 |
| Regeneration | Steam (using technique developed in 1963). | 10% $CuSO_4$ plus HOAc and $H_2O$ in pyridine. | 10% $CuSO_4$ in $H_2O$ followed by pyridine. | 10% $CuSO_4$ in $H_2O$ followed by 28% $NH_3$ in $H_2O$. | 3% $NH_3$ in 2-propanol. |
| Cycle 2 | 10,500 | 5,400 | 16,200 | 10,800 | 13,500 |
| Regeneration | Steam, 1963 technique | Pyridine followed by 50% pyridine and 10% $CuSO_4$ in $H_2O$. | 10% $CuSO_4$ followed by pyridine. | 10% $CuSO_4$ in $H_2O$ followed by 28% $NH_3$ in $H_2O$. | 3% $NH_3$ in 2-propanol. |
| Cycle 3 | 4,500 | 16,200 | 18,270 | 7,560 | 14,625. |
| Regeneration | Steam, 1963 technique | Pyridine followed by 50% pyridine and 10% $CuSO_4$ in $H_2O$. | 3% $NH_3$ in 2-propanol |   |   |
| Cycle 4 | 3,000 | 15,120 | 6,750 |   |   |
| Regeneration | Steam, 1963 technique |   |   |   |   |
| Cycle 5 | 3,000 (Upward flow in column) |   |   |   |   |
| Regeneration | Steam, 1963 technique (backwashed with 1-butanol). |   |   |   |   |
| Cycle 6 | 0 (Upward flow at 6 LHSV) |   |   |   |   |

The use of other amines in the process provide comparable results. Among the suitable amines are the following: primary, secondary and tertiary amines wherein 1, 2 or 3 hydrogens of ammonia have been replaced with alkyl groups of 1 to 7 carbon atoms. Examples of such amines are methylamine, ethylamine, propylamine, butylamine, amylamine, hexylamine, heptylamine, dimethylamine, diethylamine, dipropylamine, trimethylamine, triethylamine, and tripropylamine. Diamines and polyamines can also be used in the process. Such compounds include ethylenediamine, diethylenetriamine, triethylenetetramine, tetraethylenepentamine, and pentaethylenehexamine. Also suitable are the amino alcohols such as ethanolamine, diethanolamine, triethanolamine, and the dehydration product of diethanolamine, namely, morpholine. Among the aromatic amines that can be used in the process are aniline, o-, m-, and p-toluidine, the xylidines, o-, m-, and p-phenylenediamine, N-methylaniline, diethylaniline, triphenylamine, naphthylamine and benzylamine. Heterocyclic amines such as pyridine likewise can be used in the process.

As was pointed out above, the particulate solid ion exchange compositions which can be used in sweetening hydrocarbon liquids include inorganic aluminosilicates such as natural and synthetic zeolites as well as synthetic organic cation and anion exchange resins.

Natural zeolites are minerals having a continuous framework of linked tetrahedral groupings around silicon and aluminum atoms. The negative charge of this framework is balanced by positive ions in the cavities of the zeolites. Natural zeolites have well defined crystalline structures. Among the well known natural zeolites are mordenite, faujasite, chabazite, gmelinite, analcite, erionite, natrolite, stilbite, heulandite, and thompsonite. Glauconite is a ferrous alumino-silicate having ion exchange capacity.

Synthetic zeolites are aluminosilicates of either the fusion or gel type. The fusion types are similar to natural zeolites and are prepared by fusing together mixtures of soda, potash, felspar and kaoline. Gel type synthetic zeolites can be prepared, for example, by adding alkali in controlled proportions to acid solutions of aluminum sulfate and sodium silicate, or by the reaction of sodium Before making the first sweetening run, 50 ml. of catalyst were treated with $NH_3$ to form the $Cu^{++}(NH_3)_4$ complex. Light catalytic naphtha (LCN) containing 100 p.p.m. of mercaptan was passed through a column of the catalyst at 100° F. A sweetening number of 60,600 was obtained.

The zeolite then was regenerated with an isopropanol (ISOH) solution containing 3% $NH_3$ heated to 150° F. Initially, 250 ml. of isopropanol was weighed. Ammonia was then bubbled into the alcohol through a gas dispersion tube. Bubbling was continued until 7.5 grams of $NH_3$ had been absorbed by the isopropanol.

The catalyst was continuously washed using a small bellows pump upflow with the same solution in a closed system. A liquid hourly space velocity (LHSV) of 12, which in this case is 600 ml. per hour, was selected for the following tests:

| Run | Regeneration, Complexed with $NH_3$ | Sweetening No. |
|---|---|---|
| 1 | 3% $NH_3$ in ISOH at 150° F | 60,600 |
| 2 | do | 55,500 |
| 3 | do | 60,800 |
| 4 | do | 47,300 |
| 5 | do | 50,500 |
| 6 | do | 60,600 |

The zeolites that can be used in the present invention expressed in terms of moles can be represented as follows:

$$0.9 \pm 0.2 M_{2/n}O : Al_2O_3 : XSiO_2$$

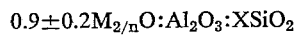

where M is selected from the group consisting of hydrogen, monovalent and divalent metal cations and mixtures thereof, $n$ is its valence, and X is a number from about 1.5 to about 12, said value being dependent upon the particular type of zeolite. The cation represented by M in the above formula will usually be a monovalent alkali metal cation, e.g., sodium, lithium or potassium before the zeolite is treated with a metal salt to produce the hydrocarbon treating material of the present invention.

In addition to inorganic base exchange materials of the type described above, synthetic organic cation and anion exchangers can be used in the process. Among the cation exchangers are the sulfonated phenolic and more particularly the sulfonated styrene base resins. The preparation of sulfonated styrene-divinyl benzene strong acid cation exchange resins is described in U.S. Patent 2,366,007. The sulfonic acid phenolformaldehyde resins are prepared by condensing a phenol sulfonic acid with formaldehyde. In general, resins having a plurality of sulfonic acid groups are useful in producing the compositions of the present invention. Weak acid cation exchange resins having carboxylic groups as the functional sites can also be used in the present invention.

The anion exchange resins which can be used in the practice of the invention include both strongly basic anion exchange resins, i.e., anion exchange resins which in the hydroxide form are capable of converting inorganic salts in an aqueous solution directly to hydroxides, and weakly basic anion exchange resins. Thus, a strongly basic anion exchange resin is capable of converting an aqueous solution of sodium chloride directly to an aqueous solution of sodium hydroxide. A strongly basic anion exchange resin can also be defined as one which on titration with hydrochloric acid in water free from electrolytes has a pH above 7.0 when the amount of hydrochloric acid added is one-half of that required to reach the inflection point (equivalence point). A weakly basic anion exchange resin under the same conditions has a pH below 7.0 when one-half of the acid required to reach the equivalence point has been added. The strongly basic anion exchange resins which are available commercially are characterized by the fact that the exchangeable anion is a part of a quaternary ammonium group. The quaternary ammonium group has the general structure:

wherein $R_1$, $R_2$ and $R_3$ represent alkyl or substituted alkyl groups, and $X^-$ is a monovalent anion.

Examples of the strongly basic anion exchange resins which can be employed in the practice of the invention are those resins disclosed in U.S. Patents 2,591,573, 2,597,440, 2,597,494, 2,614,099, 2,630,427, 2,632,000 and 2,632,001.

Weakly basic anion exchange resins of the polyamine type can also be employed in the invention. The commercially available product Dowex 3 is a material of this type. Weakly basic anion exchange resins show little or no salt-splitting capacity. Such resins are highly ionized only when in salt form and, therefore, have an anion exchange activity below pH 7.

The synthetic organic ion exchange resins that are useful in the subject process also include the chelate resins which can be prepared, for example, by reacting a chloromethylated styrene-divinyl benzene copolymer with iminodiacetic acid. The resultant resins has cation exchange capacity and is usually used in the sodium or ammonium form.

The macroporous or macroreticular cation exchange resin which can be used in the subject process preferably is a copolymer of about 60–98% of a monovinyl aromatic compound and about 2–40% of a divinyl compound, preferably a divinyl aromatic compound crosslinked together in a gel structure having macroporosity. The ion exchange sites on the resin are sulfonic acid groups provided by sulfonation of the resins, which sulfonic acid groups are placed in the metal form by contacting the sulfonic acid resin with an aqueous solution of a suitable metal salt, e.g., copper sulfate, copper acetate, mercury nitrate, mercury acetate, etc.

The preferred organic ion exchange resins for use in the invention are macroporous or macroreticular cation exchange resins having a macroporous or macroreticular, hard gel structure provided with a plurality of sulfonic acid groups as the exchange sites. In the form used in the invention, sulfonic acid groups are in the metal++ form, in which form the metal++ ion is held on two sulfonic acid groups in the resin structure.

The preferred cation exchange resins of the invention are crosslinked copolymers of about 60–98% of a monovinyl aromatic compound, such as styrene, vinyl toluene, ethyl styrene, alpha methyl styrene, vinyl naphthylene or acenaphthalene, and about 2–40% of a polyvinyl aromatic compound, such as divinyl benzene. Less preferably, the polyvinyl compound may be ethylene, dimethacrylate, vinylacrylate, vinylmethacrylate, divinyloxylate, divinyl ketone or styryl vinyl ketone.

There are several methods for preparing the aforesaid resins described in the prior art. By way of example, reference is made to British Patents 754,521 and 860,695, Canadian Patents 625,753 and 674,860, German Patent 1,045,102 and U.S. Patent 3,021,288.

The foregoing resins are sulfonated by procedures also well known in the art. An exemplary method for sulfonating a styrene-divinyl benzene gel copolymer comprises reacting the copolymer with concentrated sulfuric acid at elevated temperature to introduce sulfonic acid groups. See also U.S. Patent Nos. 2,366,077 and 2,500,149.

As is apparent from the above cited references, the primary distinctions between the process for producing microporous cation exchange resins and the process for producing macroporous cation exchange resins include: (1) the amount of crosslinking agent, and (2) the amount of solvent that is used in the process. The skeleton of a macroporous resin tends to be more rigid than that of a microporous resin. The pores of a macroporous resin will still exist when it is in a dry state, whereas the pores of a normal microporous resin shrink when the resin is dried. With a macroporous resin, liquid will enter the pre-existing holes of a dried resin, whereas with a microporous resin the liquid is absorbed by an expansion of the crosslinked network. The amount of surface available to the hydrocarbon to be treated is substantially greater with macroporous resins than with microporous resins. The sweetening capacity of microporous resins is low as compared with macroporous resins unless (1) the resin is ground to an extremely fine particle size, or (2) the resin is an oil swelling type such as a styrene-butadiene resin. In general, microporous resins and crystalline aluminosilicates should have at least one square meter per gram, and preferably at least three square meters per gram, of surface area available to the hydrocarbon. Both the synthetic amorphous zeolites and the synthetic organic macroporous ion exchange resins will have substantially greater surface area available to the hydrocarbon and therefore are highly acceptable from this standpoint.

The hydrocarbons with which the invention is concerned are liquid hydrocarbons capable of flowing a bed of resin at the treatment temperature. These liquid hydrocarbons may be liquid alkanes, liquid alkenes, liquid aromatics, such as benzene, toluene and/or xylene, liquid cycloaliphatic hydrocarbons, such as cyclohexane, and mixtures thereof. Exemplary hydrocarbon compositions are mixtures of $C_6$ to $C_{18}$ aliphatic hydrocarbons, kerosene, light virgin naphtha, heavy virgin naphtha, 12 pound virgin naphthas, light catalytically cracked naphtha, heavy catalytically cracked naphtha, 12 pound catalytically cracked naphtha, naphthenes, jet fuels, and the like.

The mercaptan impurity in the liquid hydrocarbons has the formula of RSH wherein R is the hydrocarbon radical of the mercaptan. It may be a $C_1$ to $C_{20}$ alkyl or alkenyl group, an aromatic hydrocarbon group, such as phenyl or phenyl which is ring-substituted with 1–3 alkyl groups of 1–12 carbons, naphthyl, phenyl which is ring-substituted with 1–3 hydroxy groups, etc., aralkyl, such as benzyl, phenyl ethyl and the like wherein the alkyl group has 1–8 carbons, cycloalkyl, such as cyclohexyl, cyclooctyl, and the like wherein the cycloalkyl group has 5-8 ring carbons, and like groups which normally occur as the nuclei of the mercapto compounds found as imprities in the various kinds of liquid hydrocarbons.

As is shown in the above examples, the use of $CuSO_4$ either in an $NH_3$ alcohol system or after an ammonia wash often produces beneficial results. $CuSO_4$ in ammonia water, for example, has been tried for four cycles with good results after each cycle. Likewise, the use of $CuSO_4$ either prior to or after a pyridine wash is very effective in regenerating the spent copper catalyst.

For the reasons stated above, a preferred method of regenerating the spent catalyst involves passing a solution of ammonia or an amine upflow through the catalyst bed. It is also possible, of course, to achieve successful regeneration flowing the regenerant in a downward direction through the catalyst bed.

If a liquid amine is used as a regenerant, the amine itself can be passed through the bed. It has been found to be desirable, however, to follow that wash with an organic solvent wash. Pyridine, for example, has been used successfully in the subject process by itself, that is, without first dissolving the pyridine in a solvent. In most instances, however, it is preferred to dissolve the amine in a suitable solvent.

The concentration of ammonia or amine in the solvent can vary widely. In some instances a solution as dilute as 1 to 3% can be employed. The upper concentration limit can vary all the way up to the saturation point.

One of the numerous advantages of the subject process is that the reactivation or regeneration of the spent catalyst can be carried out at low temperatures. Ordinarily, the spent catalyst will be treated at about room temperature. If it is desired, of course, higher temperatures up to the decomposition temperature of the resin may be used.

The process can also be carried out at atmospheric pressure. If it is desired, however, a vacuum can be used, e.g., up to a relatively high vacuum approaching 0 mm. Hg.

The length of time required to regenerate the catalyst depends on the condition of the catalyst itself and on the particular regenerant as well as the concentration of the regenerant in the solvent solution. Generally, from 2 to 4 washes of 8-hour duration have been sufficient to reactivate the catalyst. After each wash the amine or ammonia solution is discarded and a fresh solution is employed. The number of washes and the duration of each individual wash that is required to bring the catalyst back to full efficiency can readily be determined by experiment. Following the regeneration of a given duration the resin can be put back into the sweetening cycle where the effluent can be analyzed to determine its RSH content.

In a still preferred embodiment of the subject invention, an oxidizing agent such as air or molecular oxygen is injected into the ammonia or amine solution prior to its use as a regenerant. The addition of the oxidizing agent to the regenerant appears to assist in converting copper mercaptide to cupric copper which goes on the resin. The best mode presently contemplated for carrying out this embodiment comprises feeding air into the solvent along with the amine or ammonia. The amount of oxidizing agent which is fed into the solvent can vary widely, for example, from a quantity of less than that required to saturate the solution up to an amount greater than that required to produce a saturated solution. In a preferred embodiment the amount of air or other oxidizing agent fed into the solvent is insufficient to form bubbles.

Obviously many modifications and variations of the invention as hereinbefore set forth may be made without departing from the spirit and scope thereof, and therefore only such limitations should be imposed as are indicated in the appended claims.

We claim:
1. In a process for sweetening sour hydrocarbon liquids wherein said liquids are placed in contact with a particulate material selected from the group consisting of
   (1) an aluminosilicate ion exchange composition having at least one square meter per gram of surface area available to said hydrocarbon and containing an ion of a metal selected from the group consisting of copper, mercury, silver, lead, cobalt, iron, platinum and palladium, and
   (2) a synthetic organic resin ion exchange composition containing an ion of a metal selected from the group consisting of copper, mercury, silver, lead, cobalt, iron, platinum, and palladium, whereby said organic mercaptans are converted in part to disulfides of the formula RSSR wherein R in the formula represents the hydrocarbon residue of the organic mercaptans, and separating the sweetened hydrocarbon composition from said particulate material, the improvement which comprises: regenerating the particulate material after it has reached a point of low sweetening efficiency by contacting said finely divided particulate composition with a member selected from the group consisting of ammonia and an amine.

2. A process as in claim 1 wherein regeneration of the particulate material is accomplished by contacting the material with an aqueous solution of ammonia or an amine.

3. A process as in claim 1 wherein regeneration of the particulate material is accomplished by contacting the material with an organic solvent having dissolved therein a material selected from the group consisting of ammonia and an amine.

4. A process as in claim 3 wherein the regenerant dissolved in the organic solvent is selected from the group consisting of ammonia, primary, secondary and tertiary amines wherein 1, 2 or 3 hydrogens of ammonia have been replaced with alkyl groups of 1 to 7 carbon atoms; an amino alcohol; an aromatic amine, and a heterocyclic amine.

5. A process as in claim 4 wherein the organic solvent used in the process is selected from the group consisting of N-butanol, isopropanol, kerosene, benzene, naphtha, ethanol, α-butyrolactone, acetone, dimethyl sulfoxide, dimethyl formamide, carbon tetrachloride, methanol and mixtures thereof.

6. A process as in claim 1 wherein the regenerant is passed upflow through the finely divided particulate solid composition.

7. An improved process as in claim 1 wherein the spent finely divided particulate composition is regenerated by contacting the composition with an organic solution containing a member selected from the group consisting of ammonia and an amine and containing a dissolved oxidizing agent.

8. A process as in claim 2 wherein the regenerant dissolved in the organic solvent is ammonia and wherein the solvent is isopropanol.

9. An improved process as in claim 7 wherein air is dissolved in said organic solution and wherein the amount of air dissolved is insufficient to form bubbles.

References Cited

UNITED STATES PATENTS

| | | | |
|---|---|---|---|
| 2,442,982 | 6/1948 | Nachod | 208—248 |
| 2,730,486 | 1/1956 | Coonradt et al. | 210—32 |
| 3,144,403 | 8/1964 | Jacob | 208—189 |
| 3,288,719 | 11/1966 | Asher et al. | 252—411 |

FOREIGN PATENTS 1,288,431  2/1962  France.

DELBERT E. GANTZ, *Primary Examiner.*

G. J. CRASANAKIS, *Assistant Examiner.*